US009979785B2

(12) United States Patent
Paulzagade et al.

(10) Patent No.: US 9,979,785 B2
(45) Date of Patent: May 22, 2018

(54) SYSTEMS AND METHODS FOR RESTORING DATA FROM OPAQUE DATA BACKUP STREAMS

(71) Applicant: Veritas Technologies LLC, Mountain View, CA (US)

(72) Inventors: Sudhakar Paulzagade, Pune (IN); Nitin Anand, Pune (IN); Saurabh Jain, Pradesh (IN)

(73) Assignee: Veritas Technologies LLC, Mountain View, CA (US)

( * ) Notice: Subject to any disclaimer, the term of this patent is extended or adjusted under 35 U.S.C. 154(b) by 212 days.

(21) Appl. No.: 14/965,249

(22) Filed: Dec. 10, 2015

(65) Prior Publication Data

US 2017/0093972 A1 Mar. 30, 2017

(30) Foreign Application Priority Data

Sep. 29, 2015 (IN) .................................... 3107/2015
Sep. 30, 2015 (IN) .................................... 3148/2015

(51) Int. Cl.

| | |
|---|---|
| ***G06F 15/16*** | (2006.01) |
| ***H04L 29/08*** | (2006.01) |
| ***H04L 29/06*** | (2006.01) |
| ***G06F 11/14*** | (2006.01) |

(52) U.S. Cl.

CPC ...... *H04L 67/1095* (2013.01); *G06F 11/1456* (2013.01); *G06F 11/1469* (2013.01); *H04L 67/42* (2013.01)

(58) Field of Classification Search

CPC .. G06F 11/1456; G06F 11/1469; H04L 67/42; H04L 67/1095

USPC ........................................ 709/201, 202, 203

See application file for complete search history.

(56) References Cited

U.S. PATENT DOCUMENTS 6,732,293 B1 * 5/2004 Schneider ........... G06F 11/1435 707/999.202
7,089,293 B2 * 8/2006 Grosner .................. H04L 29/06 370/364
7,398,272 B2 * 7/2008 Hindawi ............ H04L 63/1433 707/694

(Continued)

OTHER PUBLICATIONS

"Actifio", http://www.actifio.com/#access-your-data, as accessed Sep. 1, 2015, (Aug. 14, 2009).

(Continued)

*Primary Examiner* — Davoud Zand

(74) *Attorney, Agent, or Firm* — FisherBroyles LLP

(57) ABSTRACT

The disclosed computer-implemented method for restoring data from opaque data backup streams may include (1) initiating a virtual restore of an opaque data backup stream that is designed to be parsed exclusively by a data backup application that created the stream, (2) determining, for each block of data, an original header and tail of the block based on a restored version of the block on the client, (3) sending the original header and tail of the block to a server, (4) creating, at the server, a mapping between a location of the block of data in the stream on the server and the original header and tail of the block, and (5) restoring, without using the data backup application, data in the stream by using the mapping to restore the original headers and tails of the blocks. Various other methods, systems, and computer-readable media are also disclosed.

20 Claims, 7 Drawing Sheets

System
100

Modules
102

Initiation Module
104

Determination Module
106

Sending Module
108

Creation Module
110

Restoring Module
112

(56) References Cited

U.S. PATENT DOCUMENTS 7,634,627 B1 12/2009 Ohr et al.
8,706,915 B2 * 4/2014 Duchesneau ......... G06F 9/5072 709/203
8,990,162 B1 3/2015 Kushwah et al.
9,122,692 B1 9/2015 Dalal et al.
9,348,703 B1 * 5/2016 Mam ................... G06F 11/1451
9,665,437 B2 * 5/2017 Bhargava ............ G06F 11/1451
2002/0120763 A1 * 8/2002 Miloushev .......... G06F 11/1076 709/230
2003/0177194 A1 * 9/2003 Crocker .............. G06F 21/6218 709/206
2006/0265489 A1 * 11/2006 Moore ................ H04L 67/1095 709/223
2009/0313447 A1 12/2009 Nguyen et al.
2010/0037056 A1 * 2/2010 Follis .................. G06F 11/1464 713/171
2010/0217837 A1 * 8/2010 Ansari ................... G06Q 30/04 709/218
2010/0250497 A1 * 9/2010 Redlich ................... F41H 13/00 707/661
2012/0084523 A1 4/2012 Littlefield et al.
2014/0344340 A1 * 11/2014 Tang .................. H04L 67/2823 709/203
2015/0143064 A1 * 5/2015 Bhargava ............ G06F 11/1451 711/162
2017/0206147 A1 * 7/2017 Tomoda .............. G06F 11/1471

OTHER PUBLICATIONS

"NetApp SnapManager Software", https://www.netapp.com/us/products/management-software/snapmanager/, as accessed Sep. 1, 2015, (Jun. 25, 2011).

Posey, Brien, "How copy data management differs from traditional backup", http://searchdatabackup.techtarget.com/answer/How-copy-data-management-differs-from-traditional-backup, as accessed Sep. 1, 2015, TechTarget, (Jul. 25, 2014).

"RMAN", https://en.wikipedia.org/wiki/RMAN, as accessed Sep. 1, 2015, Wikipedia, (Sep. 8, 2009).

"Oracle Recovery Manager (RMAN)", http://www.oracle.com/technetwork/database/features/availability/rman-overview-096633.html, as accessed Sep. 1, 2015, (Aug. 23, 2010).

"NetBackup", https://www.veritas.com/product/backup-and-recovery/netbackup?id=campaign-netbackup, as accessed Sep. 1, 2015, Veritas Technologies LLC, (on or before Sep. 1, 2015).

* cited by examiner

SYSTEMS AND METHODS FOR RESTORING DATA FROM OPAQUE DATA BACKUP STREAMS

BACKGROUND

At the dawn of the information era, backups of applications and data were stored on punch cards, tapes, and then disks. Now, virtual backups are created and stored on local and remote servers all across the globe. The ease of creating backups of data and of operating systems has led many individuals and organizations to create multitudes of redundant backups. Recently, the trend in data management is changing. Copy data management is a set of principles that suggests data should be kept in fewer places, rather than more. Ideally, under copy data management schemes, a full set of data should exist in only two places—in production and in a single complete backup. Other uses of the data set, such as test environments, should make use of differentials or snapshots, storing only the parts of the data that are changed rather than the entirety of the data set.

Unfortunately, traditional systems for creating and managing backups have not yet caught up. Many traditional systems for maintaining backups only allow for full, rather than partial, restorations of the data. Some traditional systems for creating backups may store the backup data in opaque formats that can't be read by other applications that may be attempting to create snapshots or differentials of the data. Accordingly, the instant disclosure identifies and addresses a need for additional and improved systems and methods for restoring data from opaque data backup streams.

SUMMARY

As will be described in greater detail below, the instant disclosure describes various systems and methods for restoring data from opaque data backup streams by performing a virtual restore and creating a mapping, for each data block, between the parts of the restored data block that are obfuscated by the data backup application and the location of the stored data block in the opaque data backup stream.

In one example, a computer-implemented method for restoring data from opaque data backup streams may include (1) initiating, from a client, a virtual restore of an opaque data backup stream that is hosted on a server and that includes blocks of data with modified headers and tails designed to be parsed exclusively by a data backup application that created the opaque data backup stream, (2) for each block of data in the opaque data backup stream, (a) determining an original header and tail of the block based on a restored version of the block on the client, (b) sending the original header and tail of the block from the client to the server, and (c) creating, at the server, a mapping between a location of the block of data in the opaque data backup stream on the server and the original header and tail of the block, and (3) restoring, without using the data backup application, data in the opaque data backup stream by using the mapping to restore the original headers and tails of the blocks that include the data.

In one embodiment, the computer-implemented method may further include (1) creating, at the server, a hash of each block of data on the server, (2) creating, at the client, a hash of the block of data seen by the client during the virtual restore, and (3) for each block of data seen by the client, querying the server to determine whether the server has a copy of the hash of the block of data and sending the block of data to the server if the server does not have the copy of the hash. In some examples, creating the hash of the block of data may include creating a hash of a portion of the block of data that excludes the header and tail.

In one embodiment, the data backup application may not be configured to perform partial restores from the opaque data backup stream and restoring the data without using the data backup application may include restoring a subset of the opaque data backup stream while excluding a portion of the opaque data backup stream. In some examples, restoring the data in the opaque data backup stream may include creating a differential backup based on the opaque data backup stream.

In some examples, performing the virtual restore on the client may include avoiding storing the data in the opaque data backup stream on the client. In one embodiment, the virtual restore may be initiated in response to a modification of the opaque data backup stream.

In one embodiment, a system for implementing the above-described method may include (1) an initiation module, stored in memory, that initiates, from a client, a virtual restore of an opaque data backup stream that is hosted on a server and that may include blocks of data with modified headers and tails designed to be parsed exclusively by a data backup application that created the opaque data backup stream, (2) a determination module, stored in memory, that, for each block, determines an original header and tail of the block based on a restored version of the block on the client, (3) a sending module, stored in memory, that sends the original header and tail of the block from the client to the server, (4) a creation module, stored in memory, that creates, at the server, a mapping between a location of the block of data in the opaque data backup stream on the server and the original header and tail of the block, (5) a restoring module, stored in memory, that restores, without using the data backup application, data in the opaque data backup stream by using the mapping to restore the original headers and tails of the blocks that include the data, and (6) at least one physical processor configured to execute the initiation module, the determination module, the sending module, the creation module, and the restoring module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) initiate, from a client, a virtual restore of an opaque data backup stream that is hosted on a server and that includes blocks of data with modified headers and tails designed to be parsed exclusively by a data backup application that created the opaque data backup stream, (2) determine, for each block, an original header and tail of the block based on a restored version of the block on the client, (3) send the original header and tail of the block from the client to the server, (4) create, at the server, a mapping between a location of the block of data in the opaque data backup stream on the server and the original header and tail of the block, and (5) restore, without using the data backup application, data in the opaque data backup stream by using the mapping to restore the original headers and tails of the blocks that include the data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
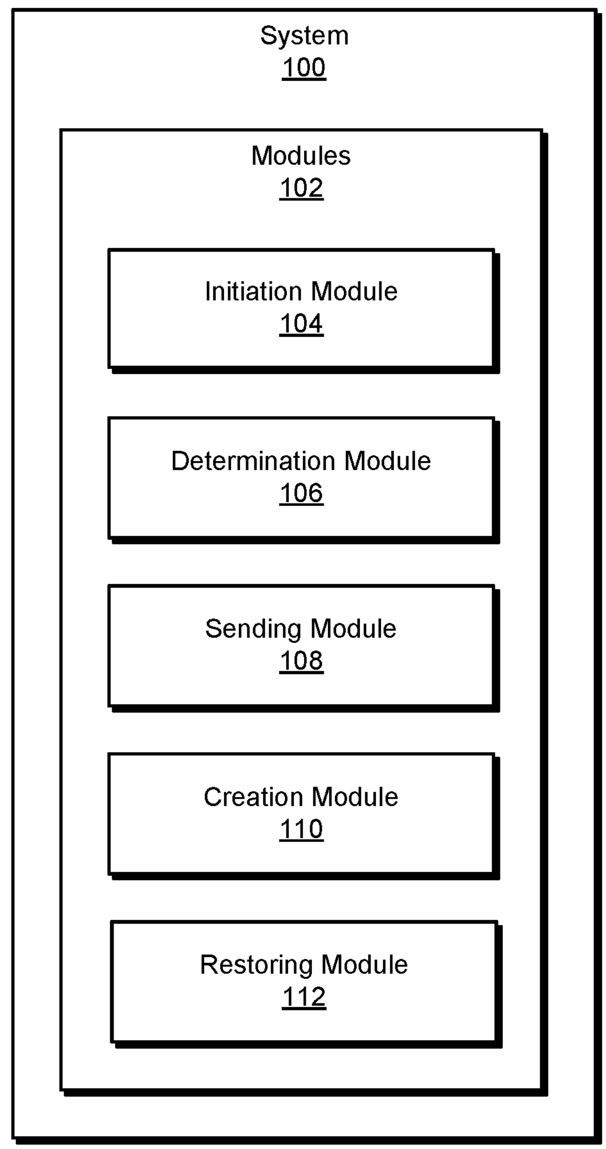
FIG. 1 is a block diagram of an exemplary system for restoring data from opaque data backup streams.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for restoring data from opaque data backup streams. As will be explained in greater detail below, by storing mappings between obfuscated data blocks in opaque data backup streams and the original versions of the obfuscated portions of the data blocks, the systems described herein may allow for full or partial restoration of backups from opaque data backup streams by applications other than the application that created the opaque data backup stream.

Figure 2:
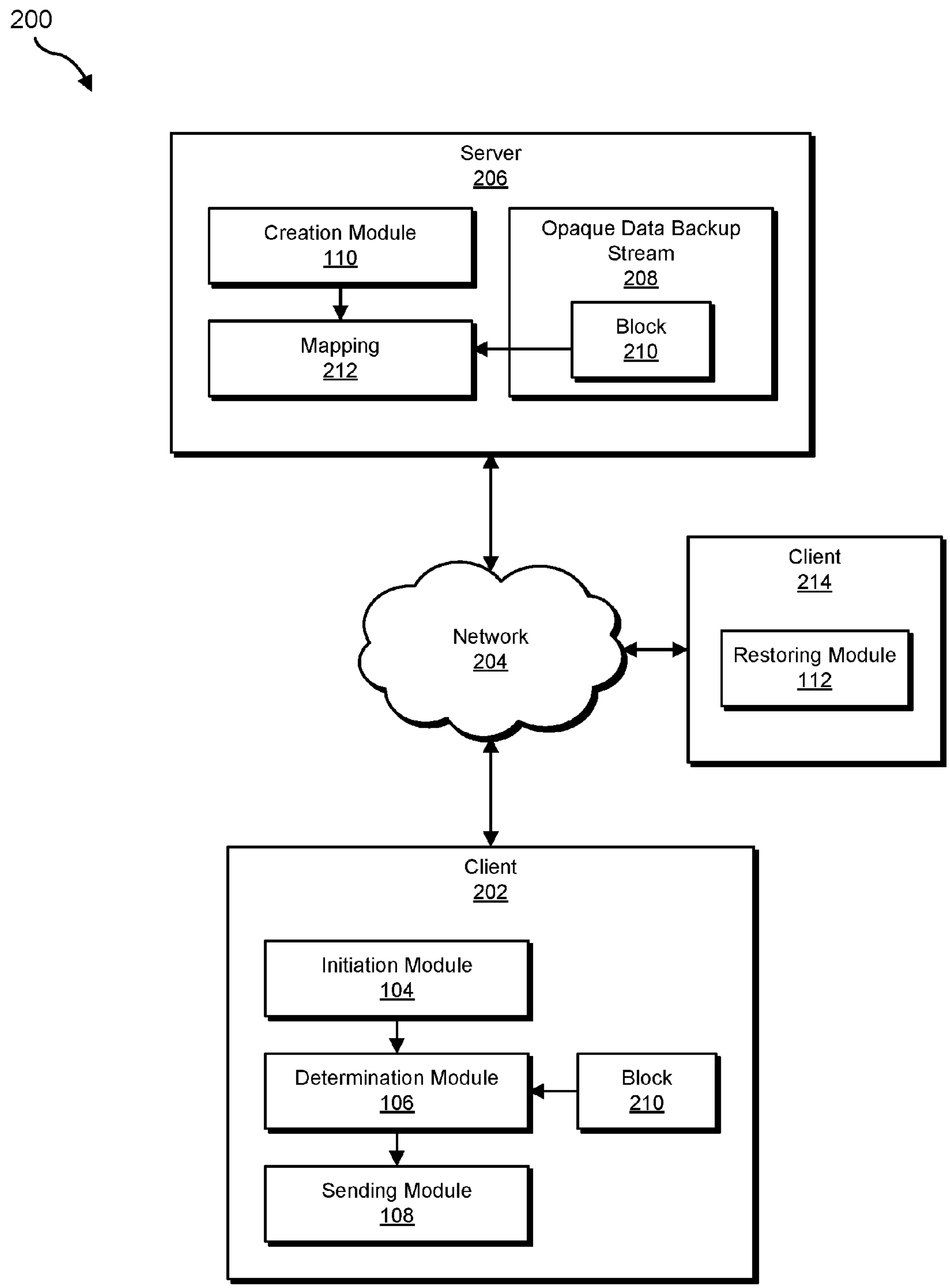
FIG. 2 is a block diagram of an additional exemplary system for restoring data from opaque data backup streams.
Figure 4:
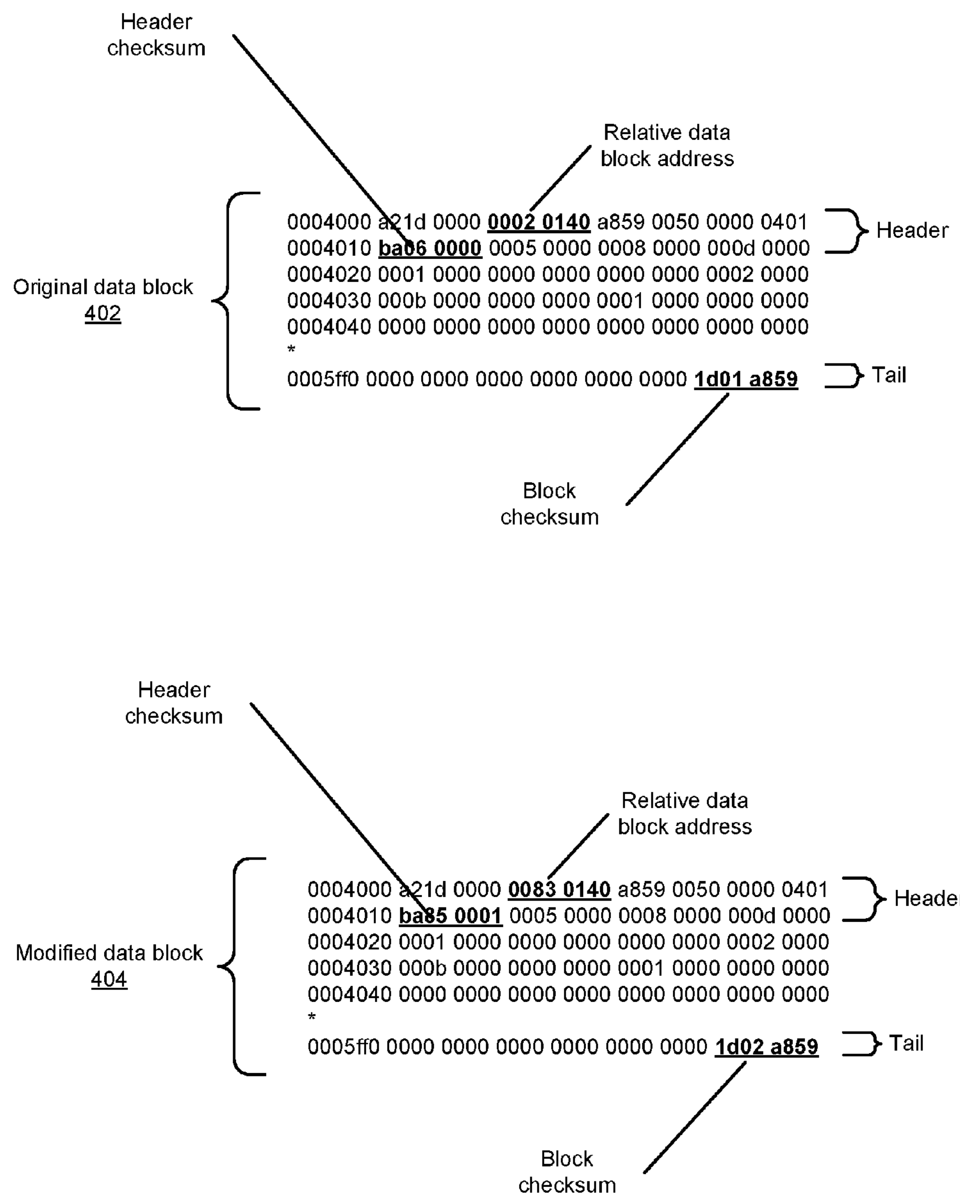
FIG. 4 is a block diagram of an exemplary data block.
Figure 5:
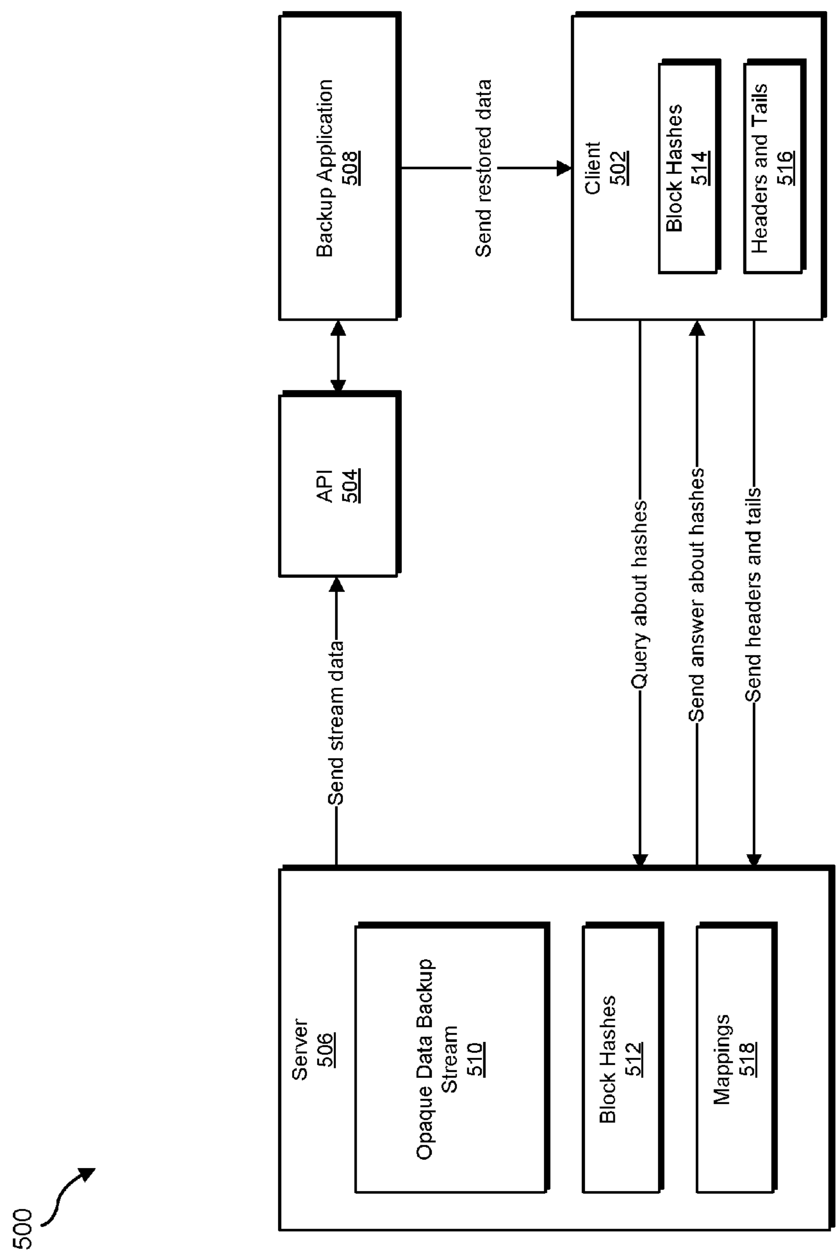
FIG. 5 is a block diagram of an exemplary computing system for restoring data from opaque data backup streams.

The following will provide, with reference to FIGS. 1, 2, and 5, detailed descriptions of exemplary systems for restoring data from opaque data backup streams. Detailed descriptions of corresponding computer-implemented methods will also be provided in connection with FIG. 3. Detailed descriptions of an exemplary data block will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for restoring data from opaque data backup streams. As illustrated in this figure, exemplary system 100 may include one or more modules 102 for performing one or more tasks. For example, and as will be explained in greater detail below, exemplary system 100 may include an initiation module 104 that initiates, from a client, a virtual restore of an opaque data backup stream that is hosted on a server and that may include blocks of data with modified headers and tails designed to be parsed exclusively by a data backup application that created the opaque data backup stream. Exemplary system 100 may additionally include a determination module 106 that determines, for each block of data, an original header and tail of the block based on a restored version of the block on the client. Exemplary system 100 may also include a sending module 108 that sends the original header and tail of the block from the client to the server. Exemplary system 100 may additionally include a creation module 110 that creates, at the server, a mapping between a location of the block of data in the opaque data backup stream on the server and the original header and tail of the block. Exemplary system 100 may also include a restoring module 112 that restores, without using the data backup application, data in the opaque data backup stream by using the mapping to restore the original headers and tails of the blocks that make up the data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client 202, client 214, and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a client 202 and/or a client 214 in communication with a server 206 via a network 204. In one example, client 202 may be programmed with one or more of modules 102. In some examples, client 214 may be programmed with one or more of modules 102. Additionally or alternatively, server 206 may be programmed with one or more of modules 102.

In one embodiment, one or more of modules 102 from FIG. 1 may, when executed by at least one processor of client 202, client 214, and/or server 206, enable client 202, client 214, and/or server 206 to restore data from opaque data backup streams. For example, and as will be described in greater detail below, initiation module 104 may initiate, from a client 202, a virtual restore of an opaque data backup stream 208 that is hosted on a server 206 and that may include blocks of data with modified headers and tails designed to be parsed exclusively by a data backup application that created opaque data backup stream 208. For each block in opaque data backup stream 208, determination module 106 may determine an original header and tail of block 210 based on a restored version of block 210 on client 202. Next, sending module 108 may send the original header and tail of block 210 from client 202 to server 206. Finally, creation module 110 may create, at server 206, a mapping 212 between a location of block 210 of data in opaque data backup stream 208 on server 206 and the original header and tail of block 210. At some later time, restoring module 112 may restore, without using the data backup application, data in opaque data backup stream 208 by using mapping 212 to restore the original headers and tails of the blocks that make up the data.

Clients 202 and/or 214 generally represent any type or form of computing device capable of reading computer-executable instructions. Examples of clients 202 and/or 214 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of hosting backup data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between client 202, client 214, and/or server 206.

Figure 3:
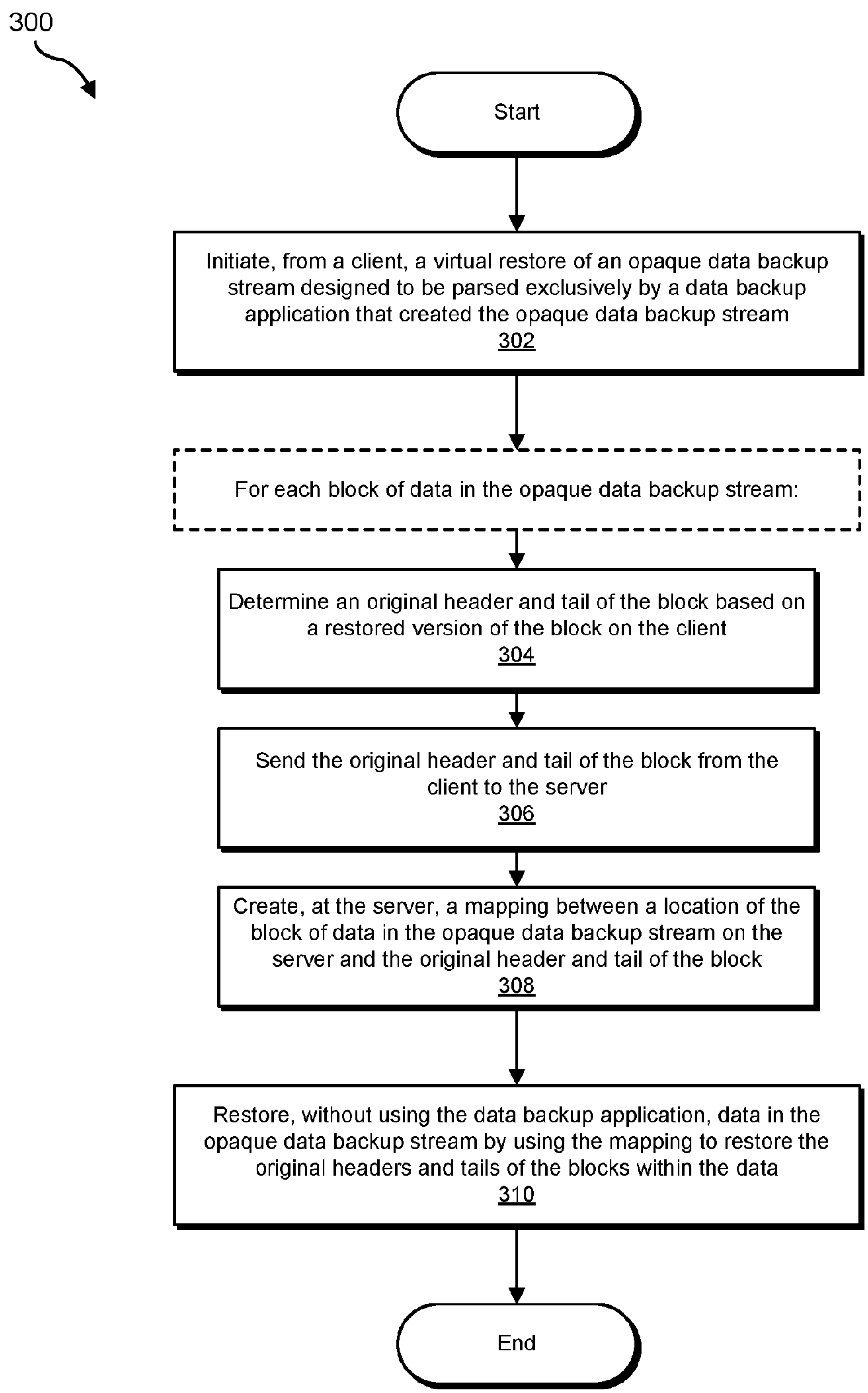
FIG. 3 is a flow diagram of an exemplary method for restoring data from opaque data backup streams.

FIG. 3 is a flow diagram of an exemplary computer-implemented method 300 for restoring data from opaque data backup streams. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may initiate, from a client, a virtual restore of an opaque data backup stream that is hosted on a server and that includes blocks of data with modified headers and tails designed to be parsed exclusively by a data backup application that created the opaque data backup stream. For example, initiation module 104 may, as part of client 202 in FIG. 2, initiate, from client 202, a virtual restore of opaque data backup stream 208 that is hosted on server 206 and that may include blocks of data with modified headers and tails designed to be parsed exclusively by a data backup application that created opaque data backup stream 208.

The term "data backup application," as used herein, generally refers to any application that is designed and/or configured to create and/or manage backup copies of data. In some embodiments, a data backup application may create backups of data by creating a backup stream of data from a production environment to a backup server. In some examples, a data backup application may create opaque data backup streams that are designed not to be readable by other data backup applications. Examples of data backup applications may include ORACLE RECOVERY MANAGER and/or SYMANTEC NETBACKUP.

The term "opaque data backup stream," as used herein, generally refers to any data that is stored in such a way that the data is partially or completely obfuscated. In some embodiments, an opaque data backup stream may be a stream of data created by a backup application and stored on a backup server. In one embodiment, an opaque data backup stream may include blocks of data with modified headers and/or tails. Additionally or alternatively, an opaque data backup stream may store blocks of data in a different order than the blocks of data are stored in the production environment. In some embodiments, data backup applications may fix corrupted data blocks while creating opaque data backup streams. In one example, an opaque data backup stream may include a data backup stream created by ORACLE RECOVERY MANAGER.

The term "block of data," as used herein, generally refers to any defined portion of a data stream. In some embodiments, a block of data may represent a single file. In one embodiment, a block of data may include a header and a tail. The term "header," as used herein, generally refers to a portion at the beginning of a block of data that includes information about the block and/or the data contained in the block. For example, a header may include the relative address of the block of data and/or a checksum of the rest of the header of the block of data. The term "tail," as used herein, generally refers to a portion at the end of a block of data that includes information about the block and/or the data contained in the block. For example, a tail may include a checksum of the entire block.

In some embodiments, the data backup application may modify the headers and tails of the data blocks in the opaque data backup stream. As illustrated in FIG. 4, original data block 402 may represent the original version of the data block in the production environment and/or the fully restored version of the data block. Modified data block 404 may represent the version of the data block created by the data backup application in the opaque data backup stream. In some examples, original data block 402 may have a different header than modified data block 404. For example, the relative data block address in the header of modified data block 404 may be different due to the location of modified data block 404 in the opaque data backup stream, resulting in the header checksum for modified data block 404 also changing. In some examples, changes earlier in the data block may result in modified data block 404 having a different tail than original data block 402. For example, the block checksum in the tail of modified data block 404 may change because of the changes to the header of modified data block 404. Thus, applications that look at the entirety of the data block, including the header and tail, may be unable to determine that modified data block 404 represents the same data as original data block 402.

The term "virtual restore," as used herein, generally refers to a restore operation that is not intended to fully restore a set of data and store the fully restored set of data on a computing system. In some examples, the systems described herein may avoid storing the entirety of the restored data on any computing system. For example, the systems described herein may discard restored data blocks as soon as the data blocks have been examined.

Initiation module 104 may initiate the virtual restore in a variety of contexts. In one embodiment, initiation module 104 may initiate the virtual restore in response to a modification of the opaque data backup stream. For example, the opaque data backup stream may be modified because the production data backup up by the stream may have been modified. In another embodiment, initiation module 104 may initiate a virtual restore at scheduled intervals. For example, initiation module 104 may initiate a virtual restore each day, each week, or each month.

Additionally or alternatively, initiation module 104 may initiate a virtual restore in response to a request from another application. For example, an additional data backup application may be attempting to restore a portion of the data from the opaque data backup stream and may prompt initiation module 104 to initiate a virtual restore in order to ensure the data in the opaque data backup stream is readable by the additional backup application. In another embodiment, initiation module 104 may monitor the opaque data backup stream and/or additional data backup applications and may initiate the virtual restore in response to detecting that an additional data backup application is attempting to perform a restore operation on the opaque data backup stream.

Returning to FIG. 3, at step 304, one or more of the systems described herein may, for each block of data, determine an original header and tail of the block based on a restored version of the block on the client. For example, determination module 106 may, as part of client 202 in FIG. 2, determine an original header and tail of block 210 based on a restored version of block 210 on client 202.

Determination module 106 may determine the original header and tail of the block in a variety of ways. For example, determination module 106 may examine the restored block and identify the header and tail. In another embodiment, determination module 106 may compare the modified block in the opaque data backup stream to the restored block in order to identify the changes to the block.

In some embodiments, determination module 106 may create a hash of each block. In some examples, determination module 106 may create the hashes of the block by excluding the header and tail of the block. The term "hash," as used herein, may refer to any abbreviated representation of a file and/or the contents of a file. For example, the term "hash" may refer to the outputs of one or more hash functions, fingerprints, checksums, and/or any other type of file identifiers that uniquely identify a file and/or file content (barring a collision).

At step 306, one or more of the systems described herein may send the original header and tail of the block from the client to the server. For example, sending module 108 may, as part of client 202 in FIG. 2, send the original header and tail of block 210 from client 202 to server 206.

Sending module 108 may send the original header and tail of the block to the server in a variety of contexts. For example, sending module 108 may send the header and tail of the block to the server as soon as the header and tail of the block are identified.

In another embodiment, sending module 106 may first send a hash of the block to the server. In this embodiment, if the server responds that it also has a hash of the block, sending module 106 may then send the header and tail of the block to the server. If the server responds that the server does not have a hash of the block, sending module 106 may send the entire block of data to the server. In some examples, the server may not have a hash of the block of data because the block of data may not be in the opaque data backup stream and instead may be reconstructed by the data backup application during restore operations. For example, a data backup application may not store a header block and/or a block zero for an opaque data backup stream. In this example, sending module 106 may send a hash of block zero to the server, the server may respond that the server does not have a hash of block zero, and sending module 106 may send the server block zero. Sending module 106 may send the server the header and tail for block zero in the same message or a separate message.

At step 308, one or more of the systems described herein may create, at the server, a mapping between a location of the block of data in the opaque data backup stream on the server and the original header and tail of the block. For example, creation module 110 may, as part of server 206 in FIG. 2, create, at server 206, mapping 212 between a location of block 210 of data in opaque data backup stream 208 on server 206 and the original header and tail of block 210.

Creation module 110 may create the mapping in a variety of ways. For example, creation module 110 may store the mapping between the location of the block of data in the opaque data stream and the original header and tail of the data in a hash. In another embodiment, creation module 110 may store the mapping in a database. In some embodiments, creation module 110 may store the original header and tail of the block in the mapping. In other embodiments, the original header and tail may be stored elsewhere on the server and creation module 110 may store a pointer to the original header and tail.

In some embodiments, before creating the mapping, creation module 110 may first create a hash of each block of data stored on the server. In this embodiment, the server may receive a message from the client asking if the server has a hash of a particular block of data. If the server responds that the server does have a hash of the block of data, creation module 110 may receive the original header and tail of the block of data to be put into the mapping. If the server responds that the server does not have a hash of the block of data, the server may receive the block of data and creation module 110 may create a mapping between the location of the block of data that is not stored in the opaque data backup stream and the original header and tail of the block of data.

In some embodiments, creation module 110 may create the hash of the blocks of data by omitting the headers and tails of the blocks. In this embodiment, the hashes created by the server of the modified blocks will match the hashes created by the client of the restored blocks because the data in the blocks that is not in the header and tail may not be changed by the data backup application.

In some embodiments, the server and the client may communicate multiple times over the course of creating mappings for the data blocks. FIG. 5 is a block diagram of an exemplary computing system 500 for restoring data from opaque data backup streams by creating mappings. As illustrated in FIG. 5, client 502 may initiate a virtual restore performed by backup application 508 that originally created opaque data backup stream 510. Opaque data backup stream 510 may have an application programming interface (API) 504 that may request stream data from server 506. Server 506 may send data from opaque data backup stream 510 to backup application 508 via API 504. Backup application 508 may then send the restored stream data to client 502, which may create block hashes 514 from the blocks of data. Client 502 may also identify original headers and tails 516 for each block of data. Client 502 may send block hashes 514, singly and/or in groups, to server 506. Server 506 may attempt to match the hashes in block hashes 514 with the hashes in block hashes 512. Server 506 may then reply to client 502 about which hashes in block hashes 514 are present in block hashes 512 and which are not. Client 502 may send server 506 data blocks for any block hashes that server 506 could not find in block hashes 512. Client 502 may also send original headers and tails 516 to server 506. Finally, server 506 may create mappings 518 between the location each block of data in opaque data backup stream 510 and original headers and tails 516. By only sending complete blocks that are not already on server 506, and otherwise sending merely original headers and tails 516 for blocks already present on 506, the systems described herein may considerably reduce the network traffic required to generate a complete set of mappings 518.

In some embodiments, backup application 508 may include an ORACLE RECOVERY MANAGER kernel, server 506 may include an ORACLE RECOVERY MANAGER server, and/or client 502 may include an ORACLE RECOVERY MANAGER client. In some embodiments, API 504 may be part of ORACLE RECOVERY MANAGER. In other embodiments, API 504 may be part of SYMANTEC NETBACKUP. In some embodiments, backup application 508, client 502, and/or API 504 may all be part of a NETAPP SNAPMANAGER instance and/or server 506 may be part of a SYMANTEC NETBACKUP appliance.

Returning to FIG. 3, at step 310, one or more of the systems described herein may restore, without using the data backup application, data in the opaque data backup stream by using the mapping to restore the original headers and tails of the blocks that make up the data. For example, restoring module 112 may, as part of client 214 in FIG. 2, restore, without using the data backup application, data in opaque data backup stream 208 by using mapping 212 to restore the original headers and tails of the blocks that make up the data.

Restoring module 112 may restore data in the opaque data backup stream in a variety of contexts. For example, restoring module 112 may be hosted on the same client that performed the virtual restore. In another embodiment, restoring module 112 may be hosted on a different client.

In some embodiments, the data backup application may not be configured to perform partial restores from the opaque data backup stream and restoring module 112 may restore the data without using the data backup application to restore a subset of the opaque data backup stream while excluding a portion of the opaque data backup stream. For example, restoring module 112 may restore the data in the opaque data backup stream by creating a differential backup based on the opaque data backup stream. In this example, restoring module 112 may read portions of the data in the opaque data backup stream and may store any changes made to the data without storing the data itself. In some examples, restoring module 112 may create a differential backup in this manner for a test environment. In some embodiments, restoring module 112 may create a differential backup and/or snapshot of the data in the opaque data backup stream by writing an amount of data that is considerably smaller in size than the totality of the data in the opaque data backup stream.

In some embodiments, restoring module 112 may restore the data by creating a synthetic backup (i.e., a roll-forward backup) by combining incremental backup data from the opaque data backup stream with a full backup image. In some examples, the application that created the opaque data backup stream may use a different block size than an additional backup application, and thus the additional backup application may not be able to create a synthetic backup from the opaque data backup stream itself. In some embodiments, the systems described herein may use the processes described above in conjunction with steps 306, 308, and 310 to create a new set of data block and hash mappings that represent the synthetic backup. In one embodiment, the new set of data blocks and hashes may also map to existing blocks (i.e., the modified version of a block in the incremental backup may map to the original version of the block in the full backup).

As explained in connection with method 300 above, the systems and methods described herein may enable copy data management on opaque data backup streams that would otherwise be unusable for anything other than complete restores performed by the original data backup application that created the opaque data backup stream. The systems and methods described herein may perform a virtual restore in order to capture the original headers and tails of data blocks from the opaque data backup stream and then may create a mapping between the headers and tails and the locations of the data blocks within the opaque data backup stream. By using this mapping, other backup applications may be able to restore any or all of the data. In some examples, the other backup applications may create differentials of the data, allowing test environments and other systems to access with data without creating entirely new copies of the data. By using the systems and methods described herein to apply copy data management techniques to opaque data backup streams, administrators may be able to provision many environments with sets of data without consuming the storage resources required by provisioning the environments with complete copies of the data or the computing resources required to perform complete restores on the opaque data backup stream.

Figure 6:
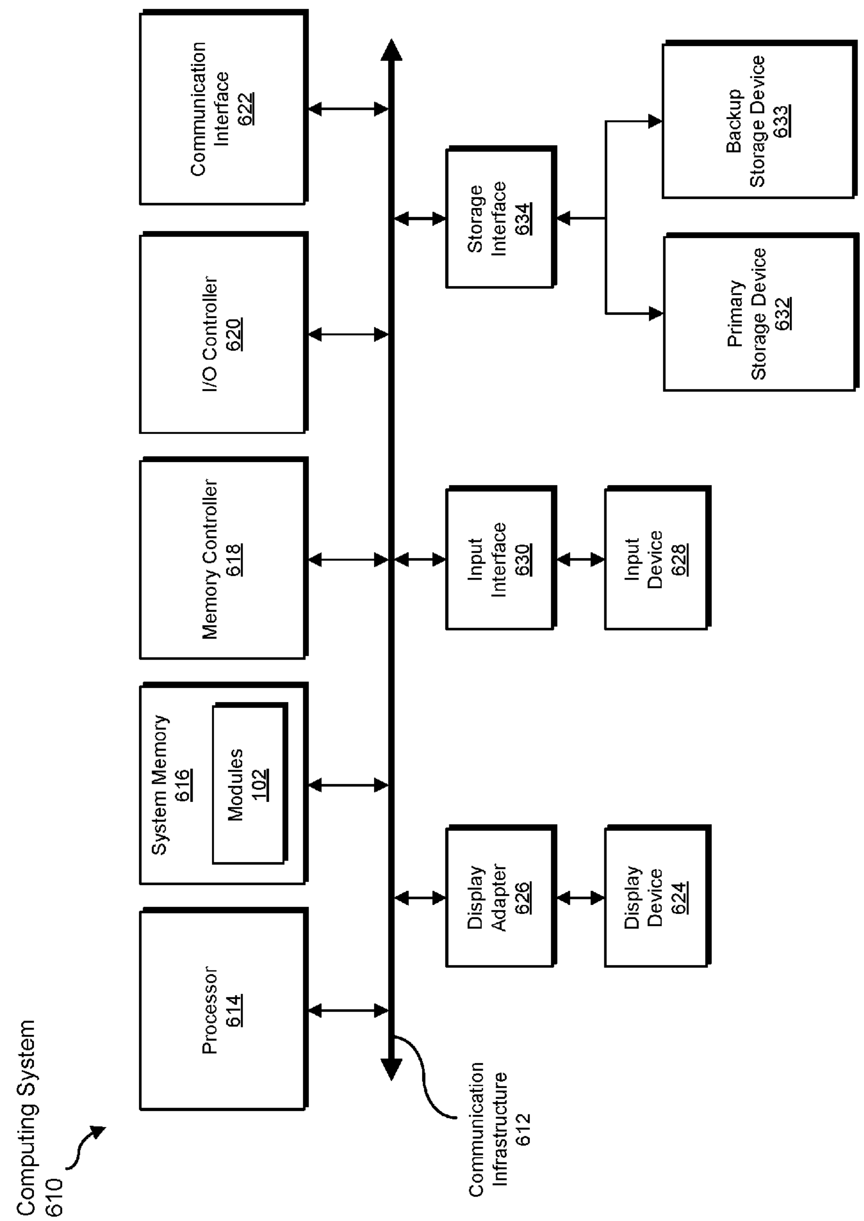
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
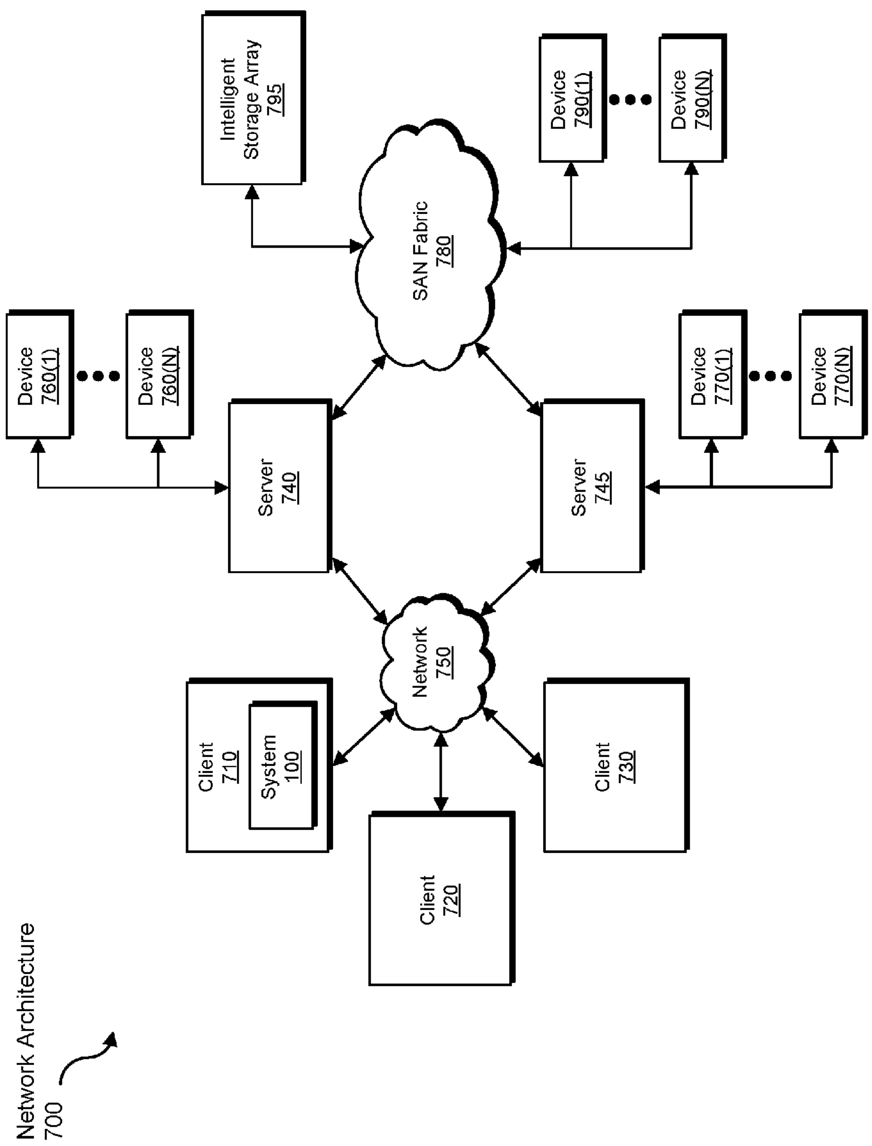
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for restoring data from opaque data backup streams.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive obfuscated data blocks to be transformed, transform the data blocks into un-obfuscated data blocks, output a result of the transformation to a server, use the result of the transformation to create a mapping between obfuscated blocks and un-obfuscated data, and store the result of the transformation to a server. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for restoring data from opaque data backup streams, at least a portion of the method being performed by a computing device comprising at least one processor, the method comprising:

initiating, from a client, a virtual restore of an opaque data backup stream that is hosted on a server and that comprises blocks of data with modified headers and tails designed to be parsed exclusively by a data backup application that created the opaque data backup stream;

for each block of data in the opaque data backup stream:

determining an original header and tail of the block based on a restored version of the block on the client, wherein determining the original header and tail comprises identifying changes to the block by comparing a modified version of the block comprising a modified header and tail in the opaque data backup stream, to the restored version of the block;

sending the original header and tail of the block from the client to the server;

creating, at the server, a mapping between a location of the block of data in the opaque data backup stream on the server and the original header and tail of the block;

restoring, without using the data backup application, data in the opaque data backup stream by using the mapping to restore the original headers and tails of the blocks that comprise the data;

reducing network traffic required to generate a complete set of mappings by only sending complete blocks that are not already on the server and sending original headers and tails for blocks already present on the server.

2. The computer-implemented method of claim 1, further comprising:

creating, at the server, a hash of each block of data on the server;

creating, at the client, a hash of the block of data seen by the client during the virtual restore;

for each block of data seen by the client:

querying the server to determine whether the server has a copy of the hash of the block of data;

sending the block of data to the server if the server does not have the copy of the hash.

3. The computer-implemented method of claim 2, wherein creating the hash of the block of data comprises creating a hash of a portion of the block of data that excludes the header and tail.

4. The computer-implemented method of claim 1, wherein:

the data backup application is not configured to perform partial restores from the opaque data backup stream;

restoring the data without using the data backup application comprises restoring a subset of the opaque data backup stream while excluding a portion of the opaque data backup stream.

5. The computer-implemented method of claim 1, wherein restoring the data in the opaque data backup stream comprises creating a differential backup based on the opaque data backup stream.

6. The computer-implemented method of claim 1, wherein performing the virtual restore on the client comprises avoiding storing the data in the opaque data backup stream on the client.

7. The computer-implemented method of claim 1, wherein the virtual restore is initiated in response to a modification of the opaque data backup stream.

8. A system for restoring data from opaque data backup streams, the system comprising:

an initiation module, stored in memory, that initiates, from a client, a virtual restore of an opaque data backup stream that is hosted on a server and that comprises blocks of data with modified headers and tails designed to be parsed exclusively by a data backup application that created the opaque data backup stream;

a determination module, stored in memory, that, for each block in the opaque data backup stream, determines an original header and tail of the block based on a restored version of the block on the client, wherein the determination module determines the original header and tail by identifying changes to the block, wherein identifying changes to the block comprises comparing a modified version of the block, the modified version of the block comprising a modified header and tail in the opaque data backup stream, to the restored version of the block;

a sending module, stored in memory, that sends the original header and tail of the block from the client to the server, wherein the sending module reduces network traffic required to generate a complete set of mappings by only sending complete blocks that are not already on the server and sending original headers and tails for blocks already present on the server;

a creation module, stored in memory, that creates, at the server, a mapping between a location of the block of data in the opaque data backup stream on the server and the original header and tail of the block;

a restoring module, stored in memory, that restores, without using the data backup application, data in the opaque data backup stream by using the mapping to restore the original headers and tails of the blocks that comprise the data;

at least one physical processor configured to execute the initiation module, the determination module, the sending module, the creation module, and the restoring module.

9. The system of claim 8, wherein:

the creation module creates, at the server, a hash of each block of data on the server;

the determination module creates, at the client, a hash of the block of data seen by the client during the virtual restore;

the sending module, for each block of data seen by the client, queries the server to determine whether the server has a copy of the hash of the block of data and sends the block of data to the server if the server does not have the copy of the hash.

10. The system of claim 9, wherein:

the creation module creates the hash of the block of data by creating a hash of a portion of the block of data that excludes the header and tail;

the determination module creates the hash of the block of data by creating a hash of a portion of the block of data that excludes the header and tail.

11. The system of claim 8, wherein:

the data backup application is not configured to perform partial restores from the opaque data backup stream;

the restoring module restores the data without using the data backup application by restoring a subset of the opaque data backup stream while excluding a portion of the opaque data backup stream.

12. The system of claim 8, wherein the restoring module restores the data in the opaque data backup stream by creating a differential backup based on the opaque data backup stream.

13. The system of claim 8, wherein the initiation module performs the virtual restore on the client by avoiding storing the data in the opaque data backup stream on the client.

14. The system of claim 8, wherein the initiation module initiates the virtual restore in response to a modification of the opaque data backup stream.

15. A non-transitory computer-readable medium comprising one or more computer-readable instructions that, when executed by at least one processor of a computing device, cause the computing device to:

initiate, from a client, a virtual restore of an opaque data backup stream that is hosted on a server and that comprises blocks of data with modified headers and tails designed to be parsed exclusively by a data backup application that created the opaque data backup stream;

determine, for each block in the opaque data backup stream, an original header and tail of the block based on a restored version of the block on the client, wherein determining the original header and tail comprises identifying changes to the block by comparing a modified version of the block comprising a modified header and tail in the opaque data backup stream, to the restored version of the block;

send the original header and tail of the block from the client to the server;

create, at the server, a mapping between a location of the block of data in the opaque data backup stream on the server and the original header and tail of the block;

restore, without using the data backup application, data in the opaque data backup stream by using the mapping to restore the original headers and tails of the blocks that comprise the data;

reduce network traffic required to generate a complete set of mappings by only sending complete blocks that are not already on the server and sending the original headers and tails for the blocks already present on the server.

16. The non-transitory computer-readable medium of claim 15, wherein the one or more computer-readable instructions cause the computing device to:

create, at the server, a hash of each block of data on the server;

create, at the client, a hash of the block of data seen by the client during the virtual restore;

for each block of data seen by the client:

query the server to determine whether the server has a copy of the hash of the block of data;

send the block of data to the server if the server does not have the copy of the hash.

17. The non-transitory computer-readable medium of claim 16, wherein the one or more computer-readable instructions cause the computing device to create the hash of the block of data by creating a hash of a portion of the block of data that excludes the header and tail.

18. The non-transitory computer-readable medium of claim 15, wherein:

the data backup application is not configured to perform partial restores from the opaque data backup stream;

restoring the data without using the data backup application comprises restoring a subset of the opaque data backup stream while excluding a portion of the opaque data backup stream.

19. The non-transitory computer-readable medium of claim 15, wherein the one or more computer-readable instructions cause the computing device to restore the data in the opaque data backup stream by creating a differential backup based on the opaque data backup stream.

20. The non-transitory computer-readable medium of claim 15, wherein the one or more computer-readable instructions cause the computing device to perform the virtual restore on the client by avoiding storing the data in the opaque data backup stream on the client.

* * * * *